(12) United States Patent
Watanabe et al.

(10) Patent No.: US 12,463,484 B2
(45) Date of Patent: Nov. 4, 2025

(54) STATOR, MOTOR, FAN DEVICE, AND COIL WINDING METHOD

(71) Applicant: MITSUBA Corporation, Gunma (JP)

(72) Inventors: Shingo Watanabe, Gunma (JP); Keiichi Hosoi, Gunma (JP); Satoshi Itabashi, Gunma (JP)

(73) Assignee: MITSUBA Corporation, Gunma (JP)

( * ) Notice: Subject to any disclaimer, the term of this patent is extended or adjusted under 35 U.S.C. 154(b) by 261 days.

(21) Appl. No.: 18/337,450

(22) Filed: Jun. 20, 2023

(65) Prior Publication Data

US 2024/0088734 A1    Mar. 14, 2024

(30) Foreign Application Priority Data

Sep. 13, 2022  (JP) .................................. 2022-145323

(51) Int. Cl.
| | | |
|---|---|---|
| *H02K 3/28* | (2006.01) | |
| *H02K 1/16* | (2006.01) | |
| *H02K 15/026* | (2025.01) | |
| *H02K 15/085* | (2006.01) | |

(52) U.S. Cl.
CPC ................. *H02K 3/28* (2013.01); *H02K 1/16* (2013.01); *H02K 15/026* (2013.01); *H02K 15/085* (2013.01)

(58) Field of Classification Search
CPC ........ H02K 3/28; H02K 21/22; H02K 15/085; H02K 1/16; H02K 11/33; H02K 15/026; H02K 3/522; H02K 5/1737; H02K 5/225
See application file for complete search history.

(56) References Cited

U.S. PATENT DOCUMENTS

| | | | | |
|---|---|---|---|---|
| 8,080,916 B2 * | 12/2011 | Shioda | ................... | H02K 23/38 |
| | | | | 310/198 |
| 2014/0339936 A1 * | 11/2014 | Sahara | ..................... | H02K 3/28 |
| | | | | 310/71 |
| 2019/0013710 A1 * | 1/2019 | Kawasaki | ............. | H02K 1/148 |

FOREIGN PATENT DOCUMENTS

JP           2021045015           3/2021

* cited by examiner

*Primary Examiner* — Leda T Pham
(74) *Attorney, Agent, or Firm* — JCIPRNET

(57) ABSTRACT

A stator includes: an A-phase coil, wound around four of 12 teeth and supplied with an A-phase current; a B-phase coil, wound around another four of the 12 teeth and supplied with a B-phase current; a C-phase coil, wound around yet another four of the 12 teeth and supplied with a C-phase current. The A-phase coil includes a transition part extending along the cylindrical part on an axial side between the teeth spaced apart in the circumferential direction. The B-phase and C-phase coils each include a transition part extending along the cylindrical part on another axial side between the teeth spaced apart in the circumferential direction. The turns of the first A-phase coil are one turn fewer than the turns of the first B-phase coil and the turns of the first C-phase coil.

9 Claims, 10 Drawing Sheets

(A)

(B)

STATOR, MOTOR, FAN DEVICE, AND COIL WINDING METHOD

CROSS-REFERENCE TO RELATED APPLICATION

This application claims the priority benefit of Japan application serial No. 2022-145323, filed on Sep. 13, 2022. The entirety of the above-mentioned patent application is hereby incorporated by reference herein and made a part of this specification.

BACKGROUND

Technical Field

The invention relates to a stator, a motor, a fan device in which the motor is mounted, and a coil winding method for the stator.

Description of Related Art

In recent years, efforts have been made to promote the Sustainable Development Goals (2030 Agenda for Sustainable Development, adopted by the United Nations Summit on Sep. 25, 2015, hereinafter referred to as "SDGs"). Along with this, techniques are known that aim to reduce waste and defective products in order to secure sustainable production and consumption patterns.

In a three-phase AC motor, a U-phase coil is wound around some of multiple teeth, a V-phase coil is wound around some other teeth, and a W-phase coil is wound around yet some other teeth. Each of the three coils is provided with a transition part crossing the teeth spaced apart in the circumferential direction.

If the transition parts of the three coils are concentrated on one side of the stator core in the axial direction, the length of the stator core in the axial direction is increased. In view of this, Patent Document 1 discloses a motor in which some transition parts of the three coils are disposed on a side of the stator core in the axial direction, and other transition parts of the three coils are arranged on the other side of the stator core in the axial direction.

PRIOR ART DOCUMENT(S)

Patent Document(s)

[Patent Document 1] Japanese Laid-open No. 2021-45015

However, in the coil whose transition part is disposed on a side of the stator core in the axial direction and the coil whose transition part is disposed on the other side of the stator core in the axial direction, the numbers of turns on the teeth are different. As a result, an issue that the driving of the motor is unstable arises.

SUMMARY

An aspect of the invention provides a stator. The stator includes 12 teeth, spaced apart in a circumferential direction and forming a ring shape; a cylindrical part, protruding from an inner periphery or an outer periphery of the 12 teeth toward two sides in an axial direction; and coils respectively wound around the 12 teeth. The coils include: an A-phase coil, wound around four of the 12 teeth and supplied with an A-phase current; a B-phase coil, wound around another four of the 12 teeth and supplied with a B-phase current; a C-phase coil, wound around yet another four of the 12 teeth and supplied with a C-phase current. The A-phase coil includes a transition part provided to extend along the cylindrical part on a side in the axial direction between the teeth spaced apart in the circumferential direction. The B-phase coil and the C-phase coil each include a transition part provided to extend along the cylindrical part on an other side in the axial direction between the teeth spaced apart in the circumferential direction. A total number of turns of the A-phase coil is two turns fewer than a total number of turns of the B-phase coil and a total number of turns of the C-phase coil.

Figure 8:
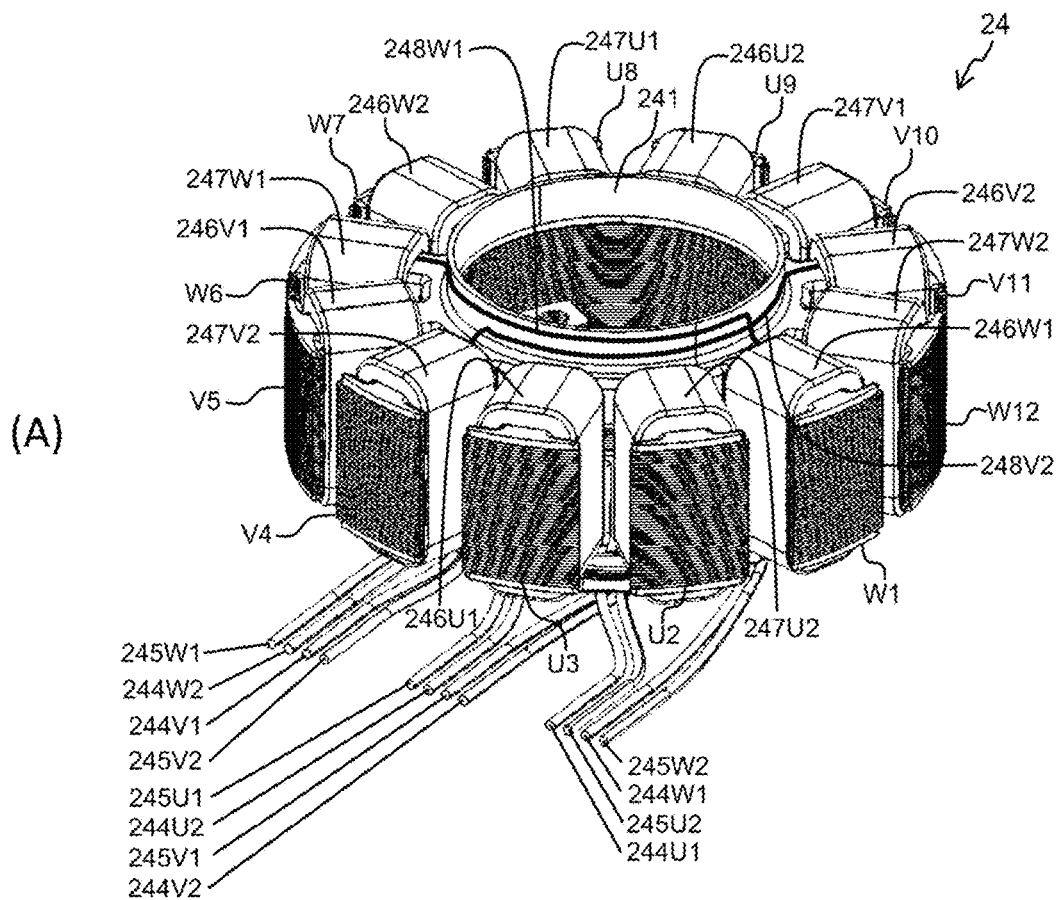
Figure 8:
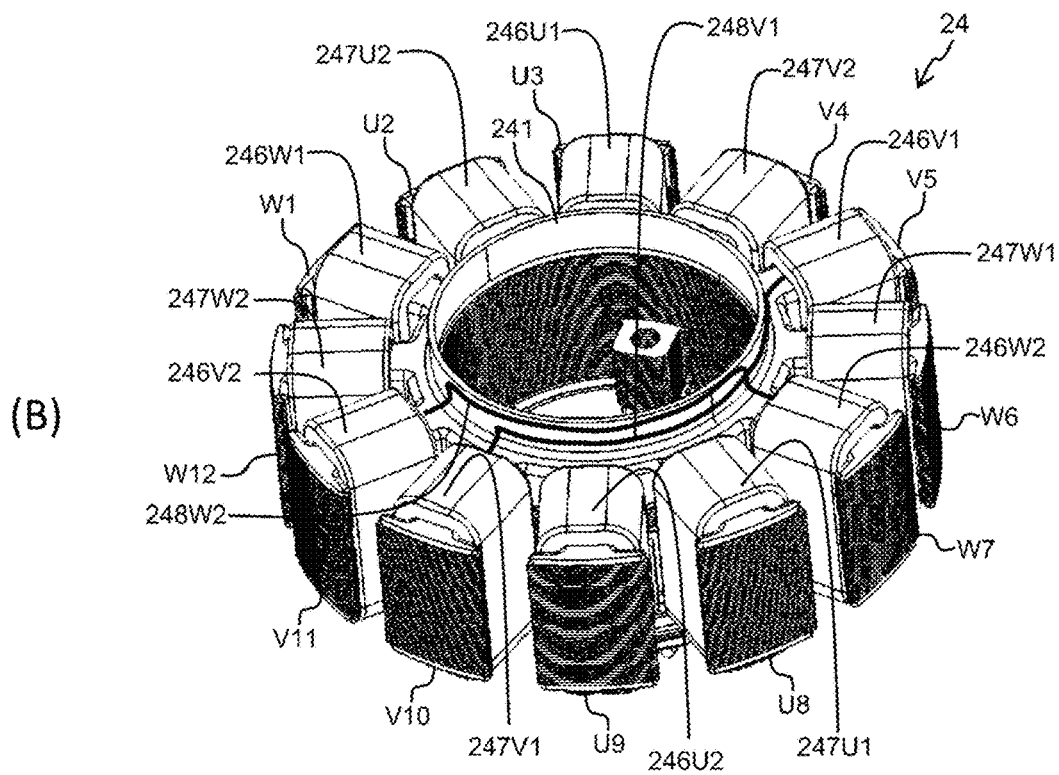

(A) and (B) of FIG. 8 are perspective views illustrating the stator from a front surface side.

Figure 9:
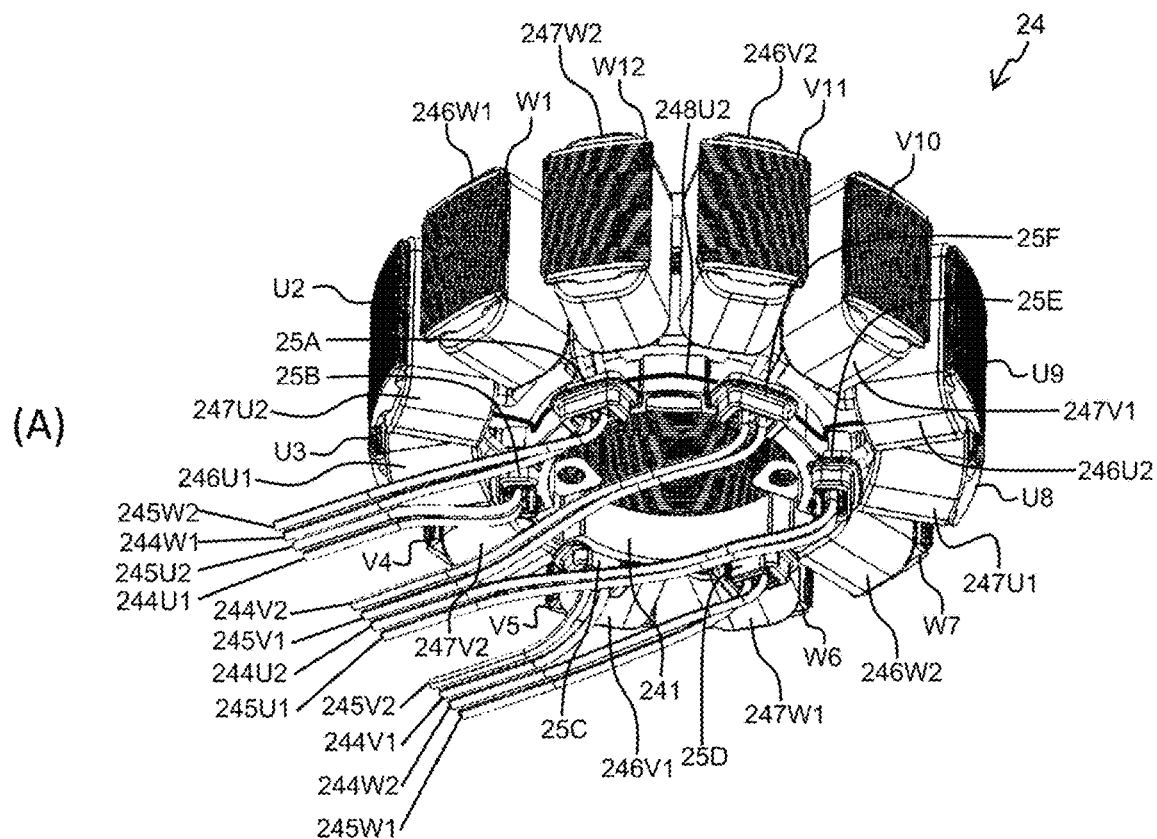
Figure 9:
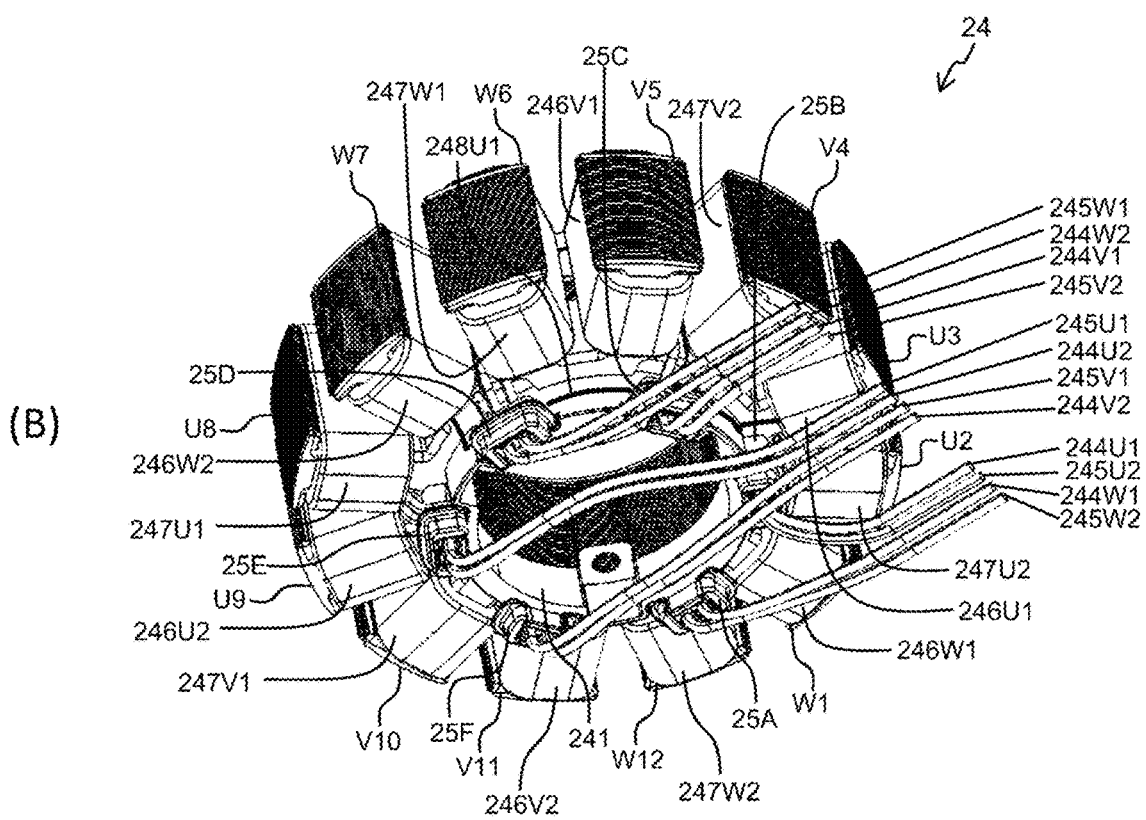

(A) and (B) of FIG. 9 are perspective views illustrating the stator from a back surface side.

Figure 10:
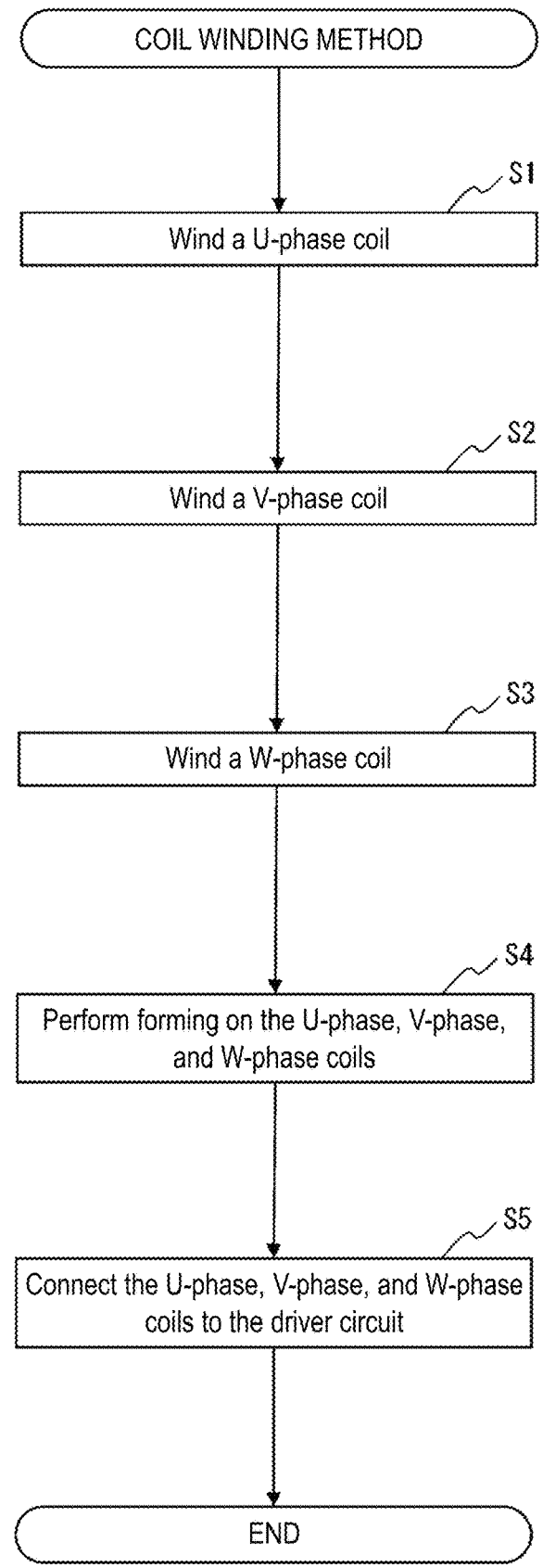

FIG. 10 is a view illustrating a coil winding procedure.

DESCRIPTION OF THE EMBODIMENTS

Accordingly, the invention provides a stator which reduces the size of the stator core in the axial direction and is able to stably drive a motor.

In order to achieve the objective, an aspect of the invention provides a stator. The stator includes 12 teeth, spaced apart in a circumferential direction and forming a ring shape; a cylindrical part, protruding from an inner periphery or an outer periphery of the 12 teeth toward two sides in an axial direction; and coils respectively wound around the 12 teeth. The coils include: an A-phase coil, wound around four of the 12 teeth and supplied with an A-phase current; a B-phase coil, wound around another four of the 12 teeth and supplied with a B-phase current; a C-phase coil, wound around yet another four of the 12 teeth and supplied with a C-phase current. The A-phase coil includes a transition part provided to extend along the cylindrical part on a side in the axial direction between the teeth spaced apart in the circumferential direction. The B-phase coil and the C-phase coil each include a transition part provided to extend along the cylindrical part on an other side in the axial direction between the teeth spaced apart in the circumferential direction. A total number of turns of the A-phase coil is two turns fewer than a total number of turns of the B-phase coil and a total number of turns of the C-phase coil.

According to the invention, a stator which reduces the size of the stator core in the axial direction and is able to stably drive the motor can be obtained. Issues, configurations, and effects other than those described above will be described in detail through the following description of the embodiments.

In the following, as a mode of a fan device according to an embodiment of the invention, a fan device mounted in a vehicle, such as an automobile, and cooling off engine cooling water flowing through a radiator, for example, is described.

(Overall Configuration of a Fan Device 1)

Figure 1:
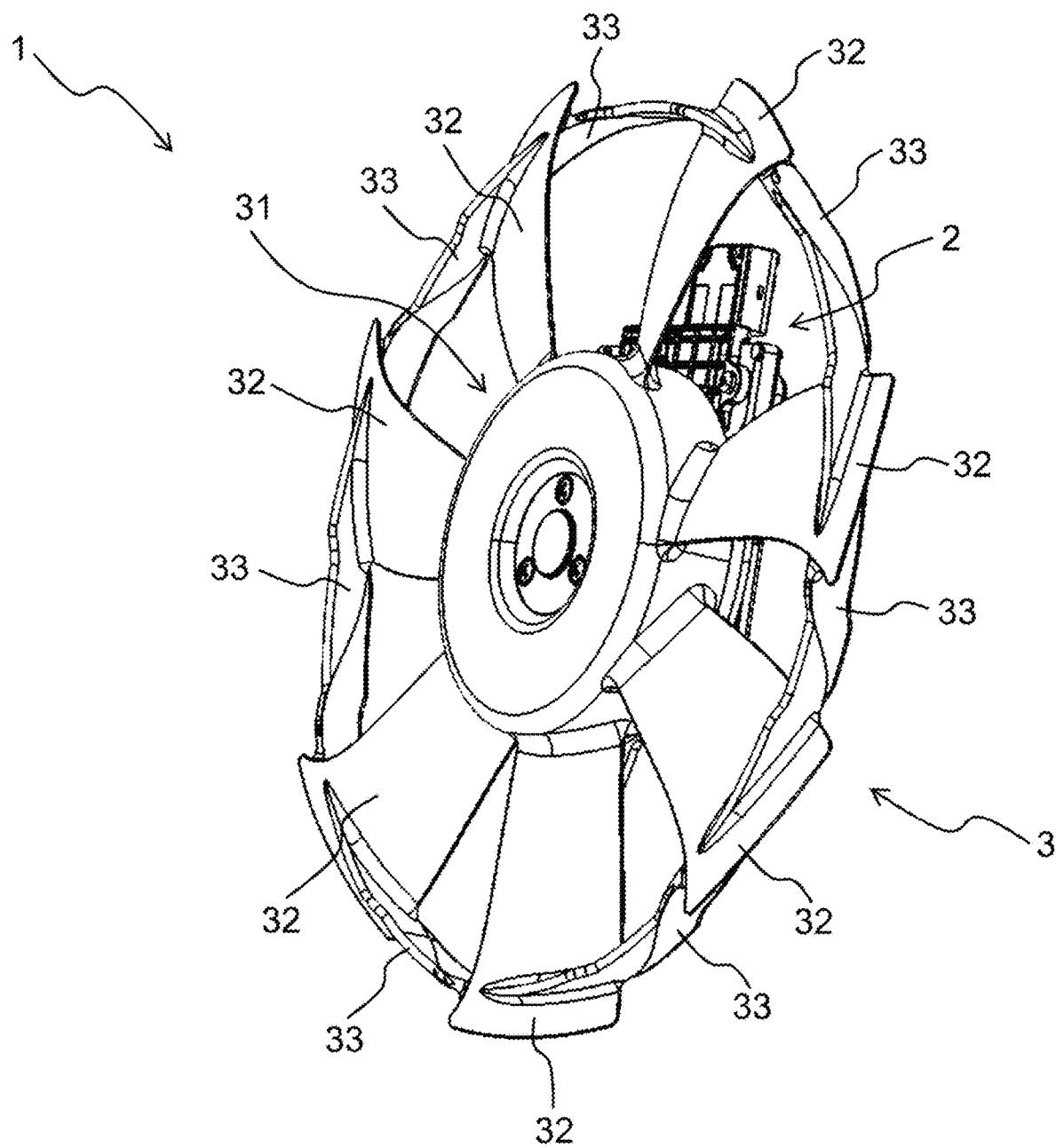
FIG. 1 is a perspective view illustrating the appearance of a configuration example of a fan device according to an embodiment.
Figure 2:
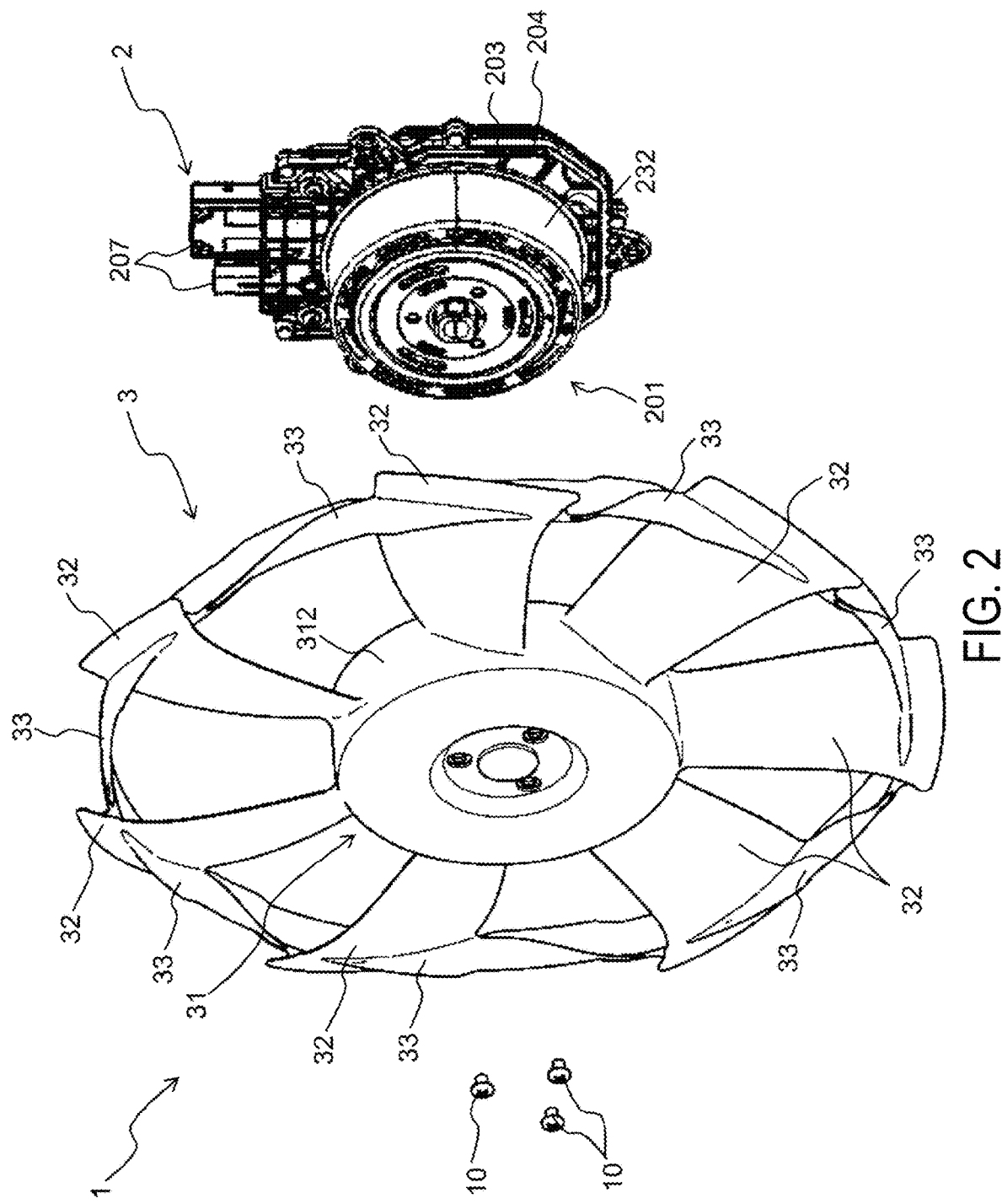
FIG. 2 is an exploded perspective view in the case where a motor and a fan are decomposed.

Firstly, with reference to FIGS. 1 and 2, the overall configuration of the fan device 1 is described. FIG. 1 is a perspective view illustrating the appearance of a configuration example of the fan device according to an embodiment. FIG. 2 is an exploded perspective view in the case where a motor 2 and a fan 3 are decomposed. As shown in FIGS. 1 and 2, the fan device 1 includes the motor 2 as a driving source and the fan 3 rotationally driven by the motor 2 to generate a cooling wind.

(Configuration of the Motor 2)

Figure 3:
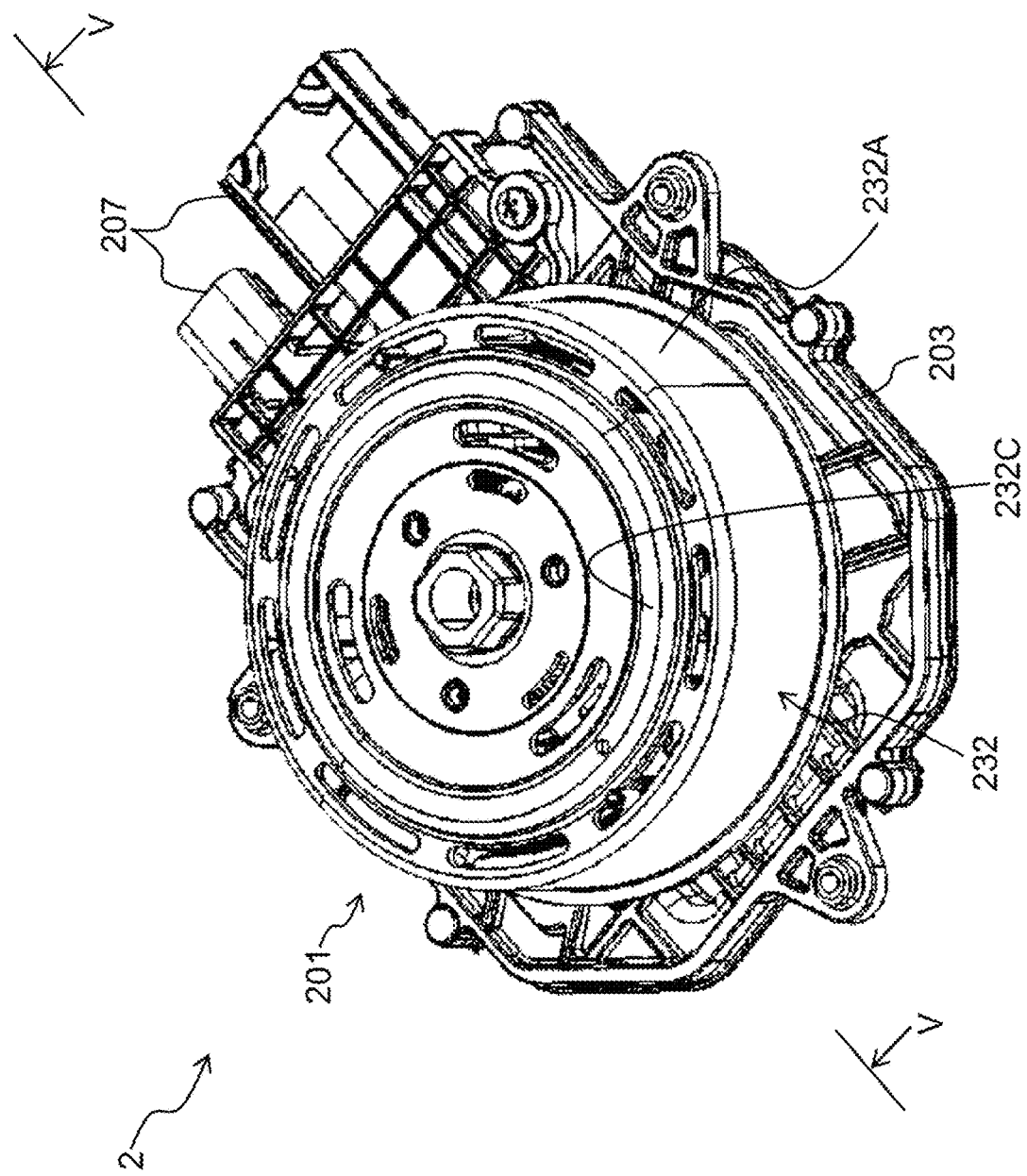
FIG. 3 is a perspective view illustrating the appearance of the motor when viewed from a front surface side.
Figure 4:
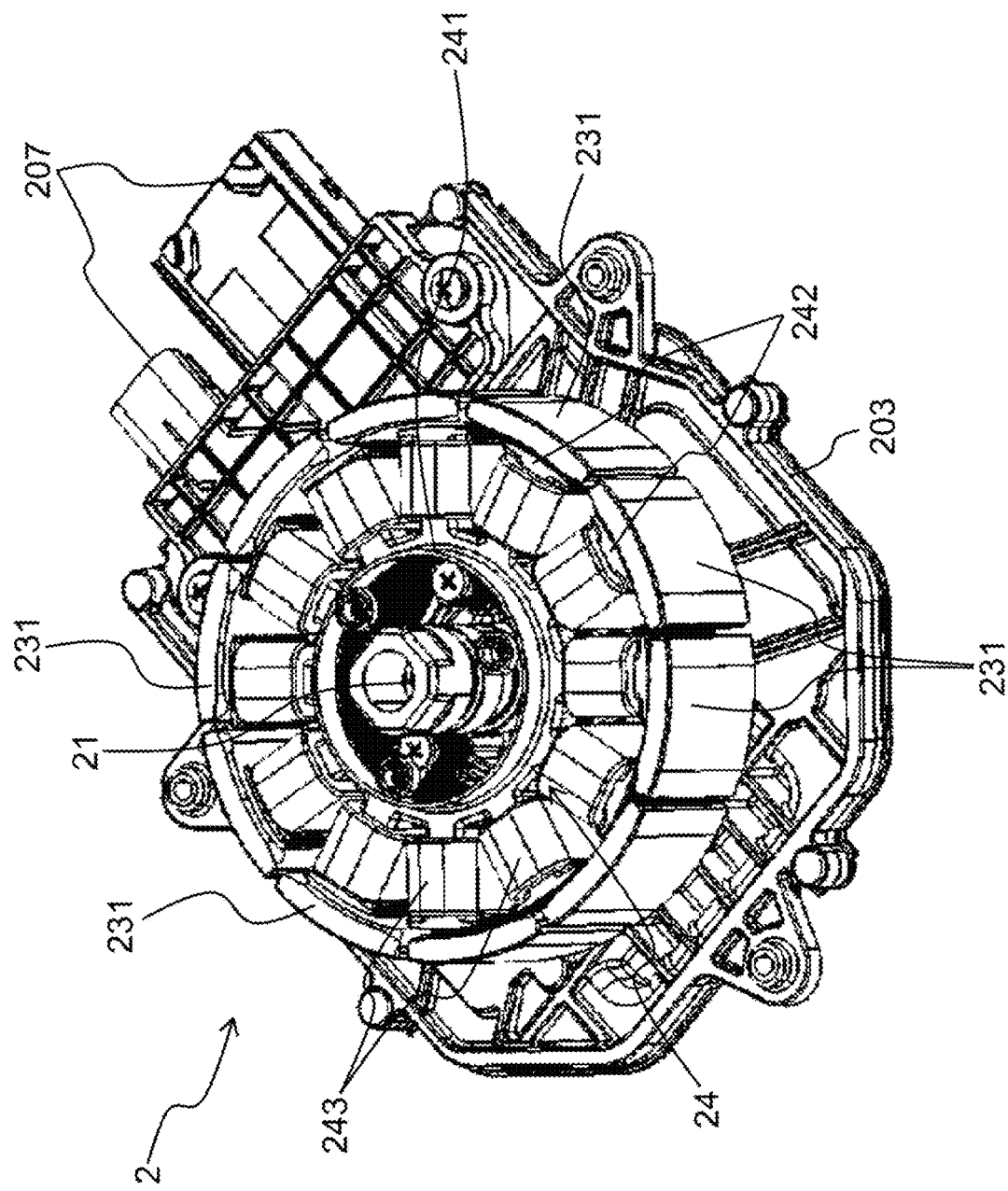
FIG. 4 is a perspective view illustrating a motor configuration in a state in which a rotor yoke is removed.
Figure 5:
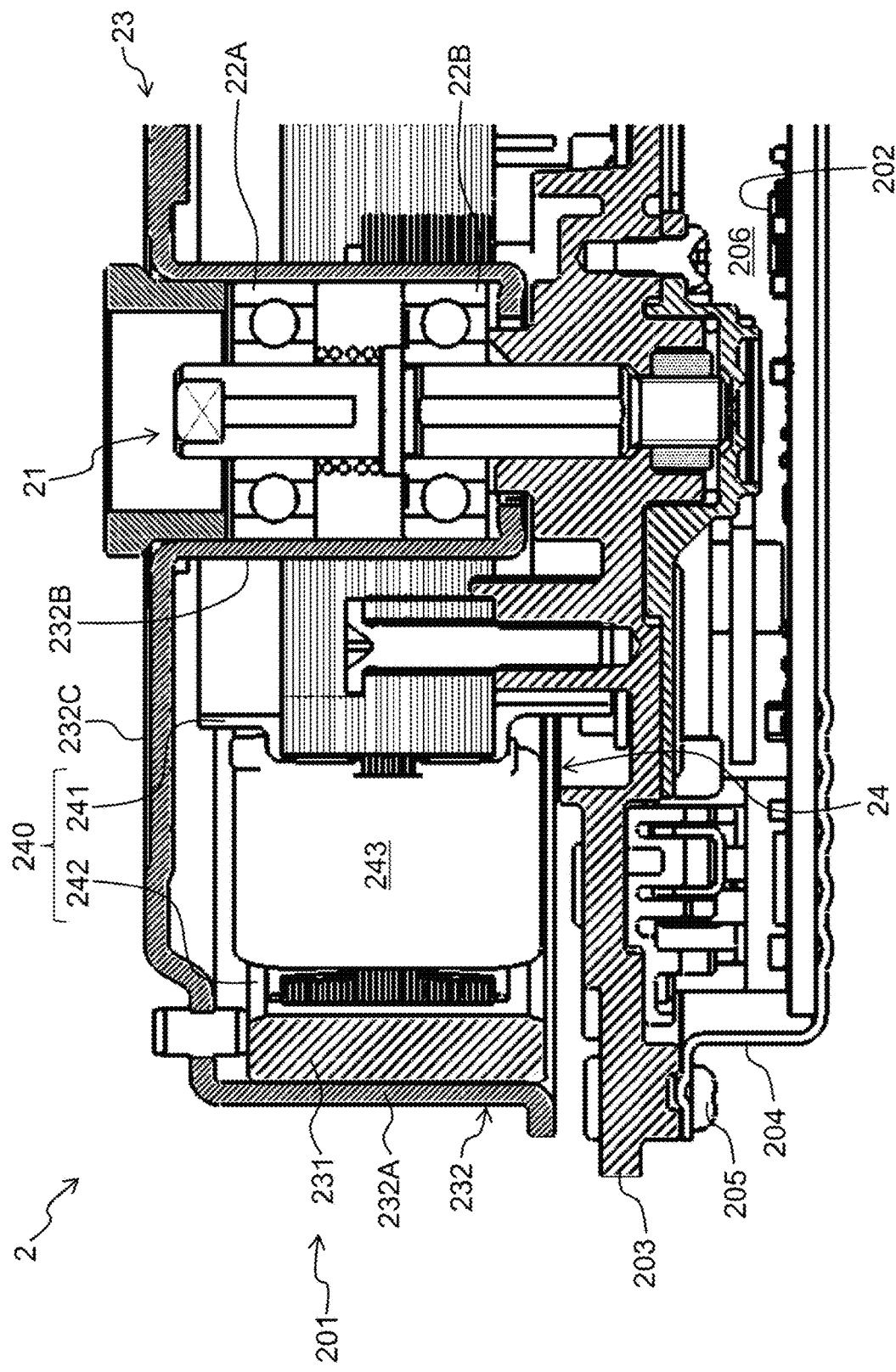
FIG. 5 is a cross-sectional view taken along a line V-V in FIG. 3.

In the following, the configuration of the motor 2 is described with reference to FIGS. 3 to 5. FIG. 3 is a perspective view illustrating the appearance of the motor 2 when viewed from a front surface side. FIG. 4 is a perspective view illustrating a configuration of the motor 2 in a state in which a rotor yoke 232 is removed. FIG. 5 is a cross-sectional view taken along a line V-V in FIG. 3.

As shown in FIGS. 3 to 5, the motor 2 is a so-called "electrically and mechanically integrated type" electric motor, and includes an outer rotor type brushless motor 201 and a driver circuit 202 controlling the brushless motor 201 (more specifically, generation of a magnetic field using coils 243). It is noted that the number of poles of the motor 2 according to the embodiment is not particularly limited, as long as the motor 2 has 12 slots.

The brushless motor 201 is supported by a plate-shaped motor bracket 203. The brushless motor 201 is disposed on a side (front surface side) of the motor bracket 203 in a thickness direction.

As shown in FIG. 5, on the other side (back surface side) of the motor bracket 203 in the thickness direction, a driver bracket 204 is fastened by multiple screws 205. Accordingly, an accommodation space 206 is formed between the motor bracket 203 and the driver bracket 204. In addition, the driver circuit 202 is accommodated in the accommodation space 206.

In addition, a connector unit 207 is attached to an end of the motor bracket 203. In the connector unit 207, two connectors connected with an external harness are integrated. The brushless motor 201, the driver circuit 202, and the connector unit 207 are electrically connected with each other via the motor bracket 203.

As shown in FIGS. 4 and 5, the brushless motor 201 includes a shaft 21, bearings 22A, 22B provided on the outer periphery of the shaft 21, a rotor 23 rotatably supported around the axial center of the shaft 21 via the bearings 22A and 22B, and a ring-shaped stator 24 on which the coils 243 that generate a magnetic field for rotating the rotor 23 is wound.

The shaft 21 is a fixed shaft fixed to the front surface side of the motor bracket 203. In the following description about the forming components of the motor 2, the shaft direction of the shaft 21 is simply referred to as "shaft direction", the radial direction with the axial center of the shaft 21 as the center is simply referred to as "radial direction", and the circumferential direction with the axial center of the shaft 21 as the center is simply referred to as "circumferential direction".

The rotor 23 includes multiple permanent magnets 231 disposed side-by-side at equal intervals in the circumferential direction to surround the outer periphery of the stator 24, and a rotor yoke 232 covering the stator 24 and the permanent magnets 231. The rotor yoke 232 is disposed on the front surface side of the motor bracket 203 so as to be concentric with the axial center of the shaft 21. In addition, the rotor yoke 232 is rotatably supported by the shaft 21 via the bearings 22A, 22B. The rotor yoke 232 includes an outer peripheral wall 232A, an inner peripheral wall 232B, and a linking wall 232C.

The outer peripheral wall 232A exhibits a cylindrical outer shape. In addition, the outer peripheral wall 232A is disposed on the outer side in the radial direction with respect to the stator 24. In addition, the outer peripheral wall 232A supports the permanent magnets 231 on the inner peripheral surface. In other words, the permanent magnets 231 are spaced apart in the circumferential direction, so as to surround the stator 24, and fixed to the inner peripheral surface of the outer peripheral wall 232A.

The inner peripheral wall 232B exhibits a cylindrical outer shape. In addition, the inner peripheral wall 232B is disposed on the inner side in the radial direction with respect to the stator 24. In addition, the inner peripheral wall 232B is rotatably supported by the shaft 21 via the bearings 22A, 22B.

The linking wall 232C exhibits a disc-shaped outer shape. In addition, the linking wall 232C connects the ends of the outer peripheral wall 232A and the inner peripheral wall 232B in the axial direction. More specifically, as shown in FIG. 5, the linking wall 232C connects the outer peripheral wall 232A and the inner peripheral wall 232B on the other end side of the shaft 21 in the axial direction of the shaft 21 (that is, the side opposite to the motor bracket 203).

The stator 24 is accommodated in a space surrounded by the outer peripheral wall 232A, the inner peripheral wall 232B, the linking wall 232C, and the motor bracket 203. In addition, as shown in FIG. 3, the stator 24 is fixed to the front surface side of the motor bracket 203 on the inner side in the radial direction with respect to the permanent magnets 231. In addition, the stator 24 faces the permanent magnets 231 via a predetermined gap in the radial direction. As shown in FIGS. 4 and 5, the stator 24 is formed by: a stator core 240 formed by a cylindrical part 241 in a cylindrical shape and multiple (12 in the embodiment) teeth 242; and multiple coils 243.

The cylindrical part 241 exhibits a cylindrical outer shape with two ends in the axial direction being open. In addition, the cylindrical part 241 is fixed to the front surface side of the motor bracket 203 at a position surrounding the shaft 21. On the outer peripheral surface of the cylindrical part 241, the 12 teeth 242 protrude radially outward from positions spaced apart in the circumferential direction. In addition, the two ends of the cylindrical part 241 in the axial direction protrude toward the two sides in the axial direction from the position of the teeth 242. In other words, the 12 teeth 242 are disposed to be spaced apart in the circumferential direction and form a ring shape. In addition, the cylindrical part 241 protrudes toward the two sides in the axial direction from the inner periphery of the 12 teeth.

The 12 teeth 242, for example, are formed by steel plates laminated in the axial direction. In addition, the stator core 240 is formed by covering the laminated steel plates by using an insulator with an insulating property. In addition, the coils 243 are wound around the teeth 242 from the top of the insulator. In addition, the cylindrical part 241 is a portion of the insulator.

The coils 243 are respectively wound around the teeth 242. In addition, the coils 243 are connected with the driver circuit 202. In addition, the driver circuit 202 supplies one of U-phase, V-phase, and W-phase currents to the coils 243. Accordingly, the coils generate the magnetic field for rotating the rotor 23. More specifically, by using the magnetic field generated by the coils 243 and the attracting force and the repulsive force generated among the permanent magnets 231, the rotor yoke 232 rotates with the axial center of the shaft 21 as the center.

Figure 6:
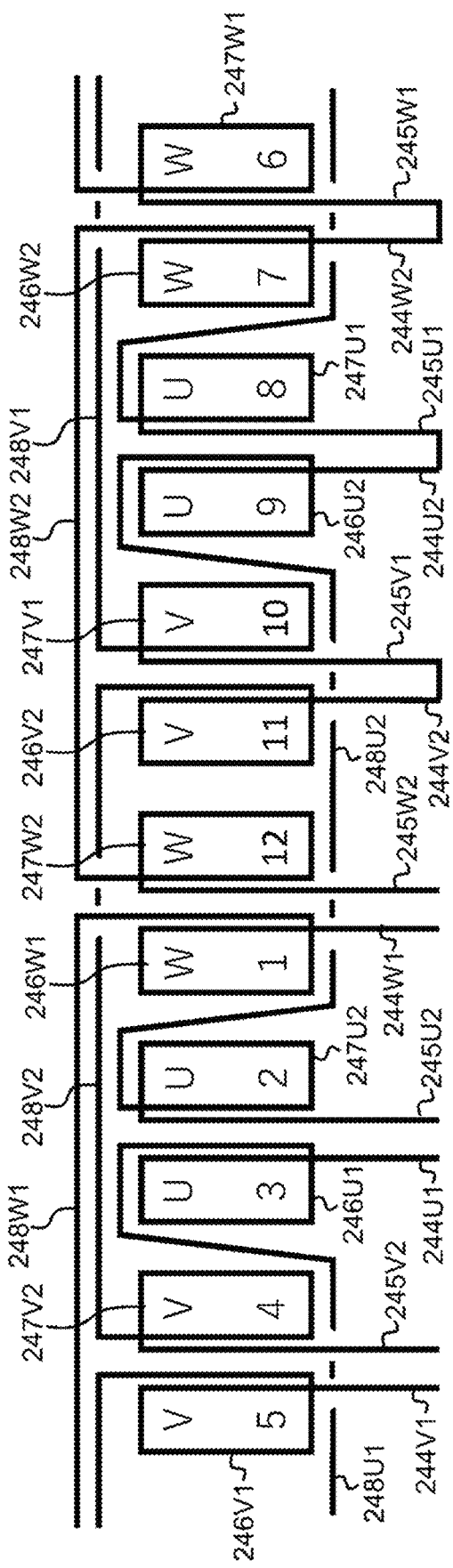
FIG. 6 is a view in which teeth and coils are expanded.
Figure 7:
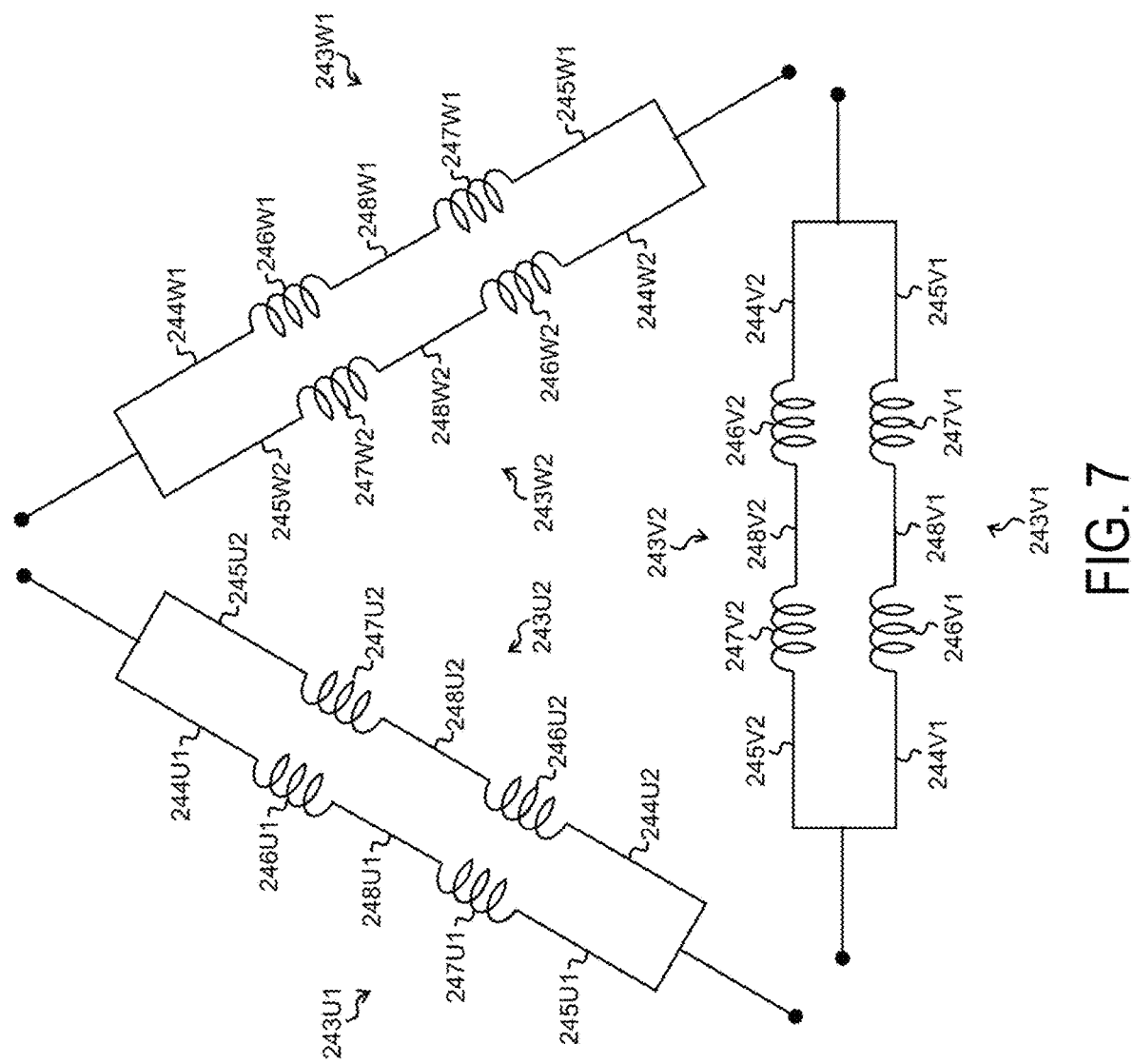
FIG. 7 is a schematic view illustrating a delta connection of coils.

FIG. 6 is a view in which the teeth 242 and the coils 243 are expanded. FIG. 7 is a schematic view illustrating a delta connection of the coils 243. (A) and (B) of FIG. 8 are perspective views of the stator 24 from the front surface side (the side opposite to the motor bracket 203). (A) and (B) of FIG. 9 are perspective views of the stator 24 from the back surface side (the side of the motor bracket 203).

As shown in FIGS. 6 and 7, the coils 243 includes coils 243U1 (first A-phase coil), 243U2 (second A-phase coil) supplied with a U-phase (A-phase) current, coils 243V1 (first B-phase coil), 243V2 (second B-phase coil) supplied with a V-phase (B-phase) current, and coils 243W1 (first C-phase coil), 243W2 (second C-phase coil) supplied with a W-phase (C-phase) current.

The coils 243U1, 243U2 serve as an example of the A-phase coil, the coils 243V1, 243V2 serve as an example of the B-phase coil, and the coils 243W1, 243W2 serve as an example of the C-phase coil. Although (A-phase, B-phase, C-phase) correspond to (U-phase, V-phase, W-phase) in the embodiment, the combination is not limited to the above example.

In addition, the coil 243 includes two connection terminals 244, 245 (specifically referred to as connection terminals 244U1, 244U2, 244W1, 244W2, 244V1, 244V2 and 245U1, 245U2, 245W1, 245W2, 245V1, 245V2, respectively, in the following) connected with the driver circuit 202, two coil parts 246, 247 (specifically referred to as coil parts 246U1, 246U2, 246W1, 246W2, 246V1, 246V2 and 247U1, 247U2, 247W1, 247W2, 247V1, 247V2, respectively, in the following) wound around the teeth 242, and a transition part 248 (specifically referred to as transition parts 248U1, 248U2, 248W1, 248W2, 248V1, 248V2 in the following) between the teeth 242 spaced apart in the circumferential direction. The connection terminals 244, 245 are portions of the two ends of the coil 243. In addition, the transition part 248 is a portion between the coil parts 246, 247. In other words, the coil part 246 is located between the connection terminal 244 and the transition part 248, and the coil part 247 is located between the connection terminal 245 and the transition part 248.

In addition, in the following description, the 12 teeth 242 are represented, in a clockwise direction in (A) and (B) of FIG. 8, as a first tooth W1, a second tooth U2, a third tooth U3, a fourth tooth V4, a fifth tooth V5, a sixth tooth W6, a seventh tooth W7, an eighth tooth U8, a ninth tooth U9, a tenth tooth V10, an eleventh tooth V11, and a twelfth tooth W12.

The coil 243U1 is wound around the third tooth U3 and the eighth tooth U8 from the driver circuit 202, and returns to the driver circuit 202. More specifically, a connection terminal 244U1 connected with the driver circuit 202 passes between the second tooth U2 and the third tooth U3, a coil part 246U1 is wound around the third tooth U3, a coil part 247U1 is wound around the eighth tooth U8, and a connection terminal 245U1 passing between the eighth tooth U8 and the ninth tooth U9 is connected with the driver circuit 202. In addition, as shown in (B) of FIG. 9, a transition part 248U1 is provided to extend between the third tooth U3 and the eighth tooth U8 spaced apart in the circumferential direction and provided to extend along the cylindrical part 241 on the side of the motor bracket 203 with respect to the teeth 242 (that is, the side in the axial direction).

The coil 243U2 is wound around the ninth tooth U9 and the second tooth U2 from the driver circuit 202, and returns to the driver circuit 202. More specifically, a connection terminal 244U2 connected with the driver circuit 202 passes between the eighth tooth U8 and the ninth tooth U9, a coil part 246U2 is wound around the ninth tooth U9, a coil part 247U2 is wound around the second tooth U2, and a connection terminal 245U2 passing between the second tooth U2 and the third tooth U3 is connected with the driver circuit 202. In addition, as shown in (A) of FIG. 9, a transition part 248U2 is provided to extend between the ninth tooth U9 and the second tooth U2 spaced apart in the circumferential direction and provided to extend along the cylindrical part 241 on the side of the motor bracket 203 with respect to the teeth 242 (that is, the side in the axial direction).

That is, the coil 243U1 is serially wound around the third tooth U3 and the eighth tooth U8 spaced apart in the circumferential direction. The coil 243U2 is serially wound around the ninth tooth U9 and the second tooth U2 spaced apart in the circumferential direction. In addition, the coils 243U1, 243U2 are connected in parallel. In addition, the number of turns of one of the coil parts 246U1, 247U1 is N turns (N being an integer of 2 or more), and the number of turns of the other is (N−1) turns. The number of turns of one of the coil parts 246U2, 247U2 is N turns, and the number of turns of the other is (N−1) turns. That is, the total number of turns of each of the coils 243U1, 243U2 is 2N−1 turns.

The coil 243V1 is wound around the fifth tooth V5 and the tenth tooth V10 from the driver circuit 202, and returns to the driver circuit 202. More specifically, a connection terminal 244V1 connected with the driver circuit 202 passes between the fourth tooth V4 and the fifth tooth V5, a coil part 246V1 is wound around the fifth tooth V5, a coil part 247V1 is wound around the tenth tooth V10, and a connection terminal 245V1 passing between the tenth tooth V10 and the eleventh tooth V11 is connected with the driver circuit 202. In addition, as shown in (B) of FIG. 8, a transition part 248V1 is provided to extend between the fifth tooth V5 and the tenth tooth V10 spaced apart in the circumferential direction and provided to extend along the cylindrical part 241 on the side opposite to the motor bracket 203 with respect to the teeth 242 (that is, the other side in the axial direction).

The coil 243V2 is wound around the eleventh tooth V11 and the fourth tooth V4 from the driver circuit 202, and returns to the driver circuit 202. More specifically, a connection terminal 244V2 connected with the driver circuit 202 passes between the tenth tooth V10 and the eleventh tooth V11, a coil part 246V2 is wound around the eleventh tooth V11, a coil part 247V2 is wound around the fourth tooth V4, and a connection terminal 245V2 passing between the fourth tooth V4 and the fifth tooth V5 is connected with the driver circuit 202. In addition, as shown in (A) of FIG. 8, a transition part 248V2 is provided to extend between the eleventh tooth V11 and the fourth tooth V4 spaced apart in the circumferential direction and provided to extend along the cylindrical part 241 on the side opposite to the motor bracket 203 with respect to the teeth 242 (that is, the other side in the axial direction).

That is, the coil 243V1 is serially wound around the fifth tooth V5 and the tenth tooth V10 spaced apart in the circumferential direction. The coil 243V2 is serially wound around the eleventh tooth V11 and the fourth tooth V4 spaced apart in the circumferential direction. In addition, the coils 243V1, 243V2 are connected in parallel. In addition, the number of turns of each of the coil parts 246V1, 247V1, 246 V2, 247V2 is N turns. That is, the total number of turns of each of the coils 243V1, 243V2 is 2N turns.

The coil 243W1 is wound around the first tooth W1 and the sixth tooth W6 from the driver circuit 202, and returns to the driver circuit 202. More specifically, a connection terminal 244W1 connected with the driver circuit 202 passes between the twelfth tooth W12 and the first tooth W1, a coil part 246W1 is wound around the first tooth W1, a coil part 247W1 is wound around the sixth tooth V10, and a connection terminal 245W1 passing between the sixth tooth W6 and the seventh tooth W7 is connected with the driver circuit 202. In addition, as shown in (A) of FIG. 8, a transition part 248W1 is provided to extend between the first tooth W1 and the sixth tooth W6 spaced apart in the circumferential direction and provided to extend along the cylindrical part 241 on the side opposite to the motor bracket 203 with respect to the teeth 242 (that is, the other side in the axial direction).

The coil 243W2 is wound around the seventh tooth W7 and the twelfth tooth W12 from the driver circuit 202, and returns to the driver circuit 202. More specifically, a connection terminal 244W2 connected with the driver circuit 202 passes between the sixth tooth W6 and the seventh tooth W7, a coil part 246W2 is wound around the seventh tooth W7, a coil part 247W2 is wound around the twelfth tooth W12, and a connection terminal 245W2 passing between the twelfth tooth W12 and the first tooth W1 is connected with the driver circuit 202. In addition, as shown in (B) of FIG. 8, a transition part 248W2 is provided to extend between the seventh tooth W7 and the twelfth tooth W12 spaced apart in the circumferential direction and provided to extend along the cylindrical part 241 on the side opposite to the motor bracket 203 with respect to the teeth 242 (that is, the other side in the axial direction).

That is, the coil 243W1 is serially wound around the first tooth W1 and the sixth tooth W6 spaced apart in the circumferential direction. The coil 243W2 is serially wound around the seventh tooth W7 and the twelfth tooth W12 spaced apart in the circumferential direction. In addition, the coils 243W1, 243W2 are connected in parallel. In addition, the number of turns of each of the coil parts 246W1, 247W1, 246W2, 247W2 is N turns. That is, the total number of turns of the coils 243W1, 243W2, respectively, is 2N turns.

According to the above, the total number of turns (2N−1) of the coil 243U1 is one turn fewer than the total number (2N) of the coil 243V1 and the total number (2N) of the coil 243W1. In addition, the total number of turns (2N−1) of the coil 243U2 is one turn fewer than the total number (2N) of the coil 243V2 and the total number (2N) of the coil 243W2. In addition, the total number of turns (4N−2) of the U-phase coils 243U1, 243U2 is 2 turns fewer than then total number of turns (4N) of the V-phase coils 243V1, 243V2 and the total number of turns (4N) of the W-phase coils 243W1, 243W2.

In addition, among the coils 243U1, 243U2, the portions (four portions, as indicated by oblique lines, between the adjacent teeth 242 in the circumferential direction in FIG. 6) connecting the coil parts 246U1, 247U1, 246U2, 247U2 and the transition parts 248U1, 248U2 are not counted in the above numbers of turns. That is, the numbers of turns only count the numbers of times of being wound by a conventional winding machine, for example. However, the four portions indicated by the oblique lines in FIG. 6 each generate a magnetic field of 0.5 turns. Therefore, by setting the total number of turns of the U-phase coils 243U1, 243U2, the total number of turns of the V-phase coils 243V1, 243V2, and the total number of turns of the W-phase coils 243W1, 243W2 to the above-mentioned relationship, the balance of the entire magnetic field is maintained.

Meanwhile, if the four portions indicated by the oblique lines in FIG. 6 are counted in the numbers of turns, the number of turns of one of the coil parts 246U1, 247U1 becomes (N+0.5) turns, and the number of turns of the other becomes (N−0.5) turns. In addition, the number of turns of one of the coil parts 246U2, 247U2 becomes (N+0.5) turns, and the number of turns of the other is (N−0.5) turns. That is, the total number of turns of the coil parts 246U1, 247U1 becomes 2N turns, and the total number of turns of the coil parts 246U2, 247U2 become 2N turns. Furthermore, the total number of turns of the U-phase coils 243U1, 243U2 become 4N turns.

As shown in FIG. 6, the connection terminals 244V1, 245V1, 244 V2, 245V2, 244 W1, 245W1, 244 W2, 245W2 of the coils 243V1, 243V2, 243 W1, 243W2 pass through to the radially outer side with respect to the transition parts 248U1, 248U2 of the coils 243U1, 243U2, and are provided to extend along the driver circuit 202.

In addition, as shown in (A) and (B) of FIG. 9, the motor 2 includes multiple positioning parts 25A, 25B, 25C, 25D, 25E, 25F. The positioning parts 25A to 25F are disposed on the side of the motor bracket 203 with respect to the teeth 242. In addition, the positioning parts 25A to 25F are disposed at predetermined intervals in the circumferential direction along the cylindrical part 241. In addition, the positioning parts 25A to 25F are fixed to the stator 24 (more specifically, the insulator), and accommodated in the concave part of the motor bracket 203.

The positioning parts 25A to 25F position the connection terminals 244U1, 245U1, 244 U2, 245U2, 244 V1, 245V1, 244 V2, 245V2, 244 W1, 245W1, 244 W2, 245W2. More specifically, the connection terminals 244W1, 244W2 are inserted into and positioned by the positioning part 25A, the connection terminals 244U1, 245U2 are inserted into and positioned by the positioning part 25B, the connection terminals 244V1, 245V2 are inserted into and positioned by the positioning part 25C, the connection terminals 244W2, 245W1 are inserted into and positioned by the positioning part 25D, the connection terminals 244U2, 245U1 are inserted into and positioned by the positioning part 25E, and the connection terminals 244V2, 245V1 are inserted into and positioned by the positioning part 25F.

Then, referring to FIG. 10, the winding direction of the coils 243 with respect to the stator 24 is described. FIG. 10 is a view illustrating a procedure of winding the coils 243.

First of all, the winding machine winds the coils 243U1, 243U2 on the teeth 242 (S1). The total number of turns in Step S1 is (4N−2) turns. More specifically, the coil part 246U1 is wound around the third tooth U3, the transition part 248U1 is provided to extend along the cylindrical part 241 on the side of the motor bracket 203 with respect to the teeth 242, and the coil part 247U1 is wound around the eighth tooth U8. In addition, the coil part 246U2 is wound around the ninth tooth U9, the transition part 248U2 is provided to extend along the cylindrical part 241 on the side of the motor bracket 203 with respect to the teeth 242, and the coil part 247U2 is wound around the second tooth U2.

Then, after Step S1 is executed, the winding machine winds the coils 243V1, 243V2 on the teeth 242 (S2). The total number of turns in Step S2 is 4N turns. More specifically, the coil part 246V1 is wound around the fifth tooth V5, the transition part 248V1 is provided to extend along the cylindrical part 241 on the side opposite to the motor bracket 203 with respect to the teeth 242, and the coil part 247V1 is wound around the tenth tooth V10. In addition, the coil part 246V2 is wound around the eleventh tooth V11, the transition part 248V2 is provided to extend along the cylindrical part 241 on the side opposite to the motor bracket 203 with respect to the teeth 242, and the coil part 247V2 is wound around the fourth tooth V4.

In addition, after Step S1 is executed, the winding machine winds the coils 243W1, 243W2 on the teeth 242 (S2). The total number of turns in Step S3 is 4N turns. More specifically, the coil part 246W1 is wound around the first tooth W1, the transition part 248W1 is provided to extend along the cylindrical part 241 on the side opposite to the motor bracket 203 with respect to the teeth 242, and the coil part 247W1 is wound around the sixth tooth W6. In addition, the coil part 246W2 is wound around the seventh tooth W7, the transition part 248W2 is provided to extend along the cylindrical part 241 on the side opposite to the motor bracket 203 with respect to the teeth 242, and the coil part 247W2 is wound around the twelfth tooth W12.

By executing Steps S2, S3 after Step S1, the connection terminals 244V1, 245V1, 244V2, 245V2, 244 W1, 245W1, 244 W2, 245W2 of the coils 243V1, 243V2, 243 W1, 243W2 are disposed on the radially outer side with respect to the transition parts 248U1, 248U2 of the coils 243U1, 243U2. It is noted that the order of executing Steps S2, S3 is not limited to the example of FIG. 10, and may be reversed.

Then, after Steps S1 to S3 are executed, the so-called forming processing is performed, in which the connection terminals 244U1, 245U1, 244 U2, 245U2, 244 V1, 245V1, 244 V2, 245V2, 244 W1, 245W1, 244 W2, 245W2 are inserted into and positioned by the positioning parts 25A to 24F (S4). More specifically, the connection terminals 244U1, 245U1, 244 U2, 245U2, 244 V1, 245V1, 244V2, 245 V2, 244W1, 245W1, 244 W2, 245W2 are pulled and inserted into the positioning parts 25A to 25F in the state of being applied a predetermined tension.

Then, after Step S4 is executed, the connection terminals 244U1, 245U1, 244 U2, 245U2, 244 V1, 245V1, 244 V2, 245V2, 244 W1, 245W1, 244 W2, 245W2 are connected with the driver circuit 202 (S5).

(Configuration of the Fan 3)

As shown in FIGS. 1 and 2, the fan 3 is provided with: a boss part 31 integrally rotating with the rotor 23, with the axial center of the shaft 21 as the rotation center; multiple (seven in the embodiment) blades 32 projecting radially from the outer periphery of the boss part 31; and multiple (seven in the embodiment) linking members 33 linking, at the tip end sides, the adjacent blades 32.

In addition, the boss part 31 includes a disc part 311 in a disc shape, and a peripheral wall part 312 protruding from the outer edge of the disc part 311 toward the motor 2 and having a cylindrical shape to which the blades 32 are attached. When the fan 3 is attached to the motor 2, the disc part 311 faces the linking wall 232C of the rotor yoke 232, and the peripheral wall part 312 surrounds the outer peripheral wall 232A of the rotor yoke 232.

As shown in FIG. 2, the fan 3 is fastened to the rotor yoke 232 by using screws 10. In the embodiment, considering the rotation balance of the fan 3, three screws 3 are attached to be equidistant on the circumference of the fan 3, with the rotation center as the center. It is noted that, as a fastening member for fastening the fan 3 to the motor 2, the three screws 10 are not required to use. The number of the screws 10 or the type of the fastening member is not particularly limited, as long as the fan 3 can be fastened to the motor 2.

According to the embodiment, effects as follows, for example, are achieved.

According to the embodiment, the U-phase transition parts 248U1, 248U2 and the V-phase and W-phase transition parts 248V1, 248V2, 248 W1, 248W2 are discretely arranged on opposite sides in the axial direction, which sandwich the teeth 242. Therefore, compared with the case of concentrating all the transition parts to a side in the axial direction, the size of the stator core 240 in the axial direction can be reduced. Accordingly, the sizes of the fan device 1 and the motor 2 can be reduced.

In addition, the total number of turns (4N-2) of the U-phase coils 243U1, 243U2 are two turns fewer than the total number of turns (4N) of the V-phase coils 243V1, 243V2 and the number of turns (4N) of the W-phase coils 243W1, 243W2. Accordingly, it is possible to absorb the difference in the number of turns resulting from dispersing the transition parts 248U1, 248U2 and the transition parts 248V1, 248V2, 248 W1, 248W2. Accordingly, the motor 2 can be driven stably. As a result, the service time of the motor 2 and the fan device 1 in which the motor 2 is mounted can be increased, and the waste and defective products can be reduced.

Here, when the total number of turns of one of the coils 243U1, 243U2 is reduced by two, the voltages of the coils 243U1, 243U2 become unequal and a circulating current is generated. Therefore, by reducing the total number of turns of the coils 243U1, 243U2 connected in parallel one at a time as in the embodiment, the motor 2 can be more stably driven.

In addition, according to the embodiment, by making the connection terminals 244V1, 245V1, 244 V2, 245V2, 244 W1, 245W1, 244 W2, 245W2 pass through the radially outer side with respect to the transition parts 248U1, 248U2 of the coils 243U1, 243U2, the forming processing is simplified. This can be realized by winding the coils 243 according to the order of FIG. 10.

In the embodiment, an example in which the invention is applied to the outer-rotor type motor 2 in which the rotor 23 is disposed on the outer side of the stator 2 is described. However, the invention is also applicable to an inner-rotor type motor in which the rotor is disposed on the inner side of the stator. It is noted that, in the stator mounted to the inner-rotor type motor, the cylindrical part protrudes toward the two sides in the axial direction from the outer periphery of 12 stators.

Also, in the embodiment, an example for supplying cooling wind to the radiator is described as the purpose of the fan device 1. However, the purpose of the fan device 1 is not limited thereto. In the embodiment, an example of a fan motor which rotationally drives the fan 3 is described as the purpose of the motor 2. However, the purpose of the motor 2 is not limited thereto.

The embodiment of the invention has been described above. However, the invention is not limited to the above embodiments, but includes various modifications. For example, the above-described embodiment has been described in detail in order to explain the invention in an easy-to-understand manner, and is not necessarily limited to those having all the described configurations. Further, a part of the configuration of the embodiment can be replaced with the configuration of another embodiment, and it is also possible to add the configuration of another embodiment to the configuration of the embodiment. Furthermore, it is possible to add, delete, or replace a part of the configuration of the embodiment with another configuration.

What is claimed is:

1. A stator, comprising: 12 teeth, spaced apart in a circumferential direction and forming a ring shape; a cylindrical part, protruding from an inner periphery or an outer periphery of the 12 teeth toward two sides in an axial direction; and coils respectively wound around the 12 teeth, wherein the coils comprise:
 an A-phase coil, wound around four of the 12 teeth and supplied with an A-phase current;
 a B-phase coil, wound around another four of the 12 teeth and supplied with a B-phase current;
 a C-phase coil, wound around yet another four of the 12 teeth and supplied with a C-phase current,
 wherein the A-phase coil comprises a transition part provided to extend along the cylindrical part on a side in the axial direction between the teeth spaced apart in the circumferential direction,
 the B-phase coil and the C-phase coil each comprise a transition part provided to extend along the cylindrical part on an other side in the axial direction between the teeth spaced apart in the circumferential direction, and
 a total number of turns of the A-phase coil is two turns fewer than a total number of turns of the B-phase coil and a total number of turns of the C-phase coil.

2. The stator as claimed in claim 1,
 wherein in the A-phase coil,
  a first A-phase coil serially wound around two of the teeth spaced apart in the circumferential direction and a second A-phase coil serially wound around another two of the teeth spaced apart in the circumferential direction are connected in parallel,
 in the B-phase coil,
  a first B-phase coil serially wound around two of the teeth spaced apart in the circumferential direction and a second B-phase coil serially wound around another two of the teeth spaced apart in the circumferential direction are connected in parallel,
 in the C-phase coil,
  a first C-phase coil serially wound around two of the teeth spaced apart in the circumferential direction and a second C-phase coil serially wound around another two of the teeth spaced apart in the circumferential direction are connected in parallel,
 a total number of turns of the first A-phase coil is one turn fewer than a total number of turns of the first B-phase coil and a total number of turns of the first C-phase coil, and
 a total number of turns of the second A-phase coil is one turn fewer than a total number of turns of the second B-phase coil and a total number of turns of the second C-phase coil.

3. The stator as claimed in claim 1, wherein the B-phase coil and the C-phase coil pass through a radially outer side with respect to the transition part of the A-phase coil.

4. A motor, comprising:
 a motor bracket;
 a shaft, fixed to a side of the motor bracket in a thickness direction;
 the stator as claimed in claim 1, fixed to the motor bracket so that the cylindrical part surrounds the shaft;
 a rotor, comprising a rotor yoke rotatably supported by the shaft and a plurality of permanent magnets spaced apart in the circumferential direction, so as to surround the stator, and supported by the rotor yoke; and
 a driver circuit, disposed on an other side of the motor bracket in the thickness direction, and generating, in the coils, a magnetic field for rotating the rotor, wherein in the motor,
 the transition part of the A-phase coil is provided to extend along the cylindrical part on a side of the motor bracket with respect to the teeth, and
 the transition part of each of the B-phase coil and the C-phase coil is provided to extend along the cylindrical part on a side opposite to the motor bracket with respect to the teeth.

5. The motor as claimed in claim 4, wherein the 12 teeth are a first tooth, a second tooth, a third tooth, a fourth tooth, a fifth tooth, a sixth tooth, a seventh tooth, an eighth tooth, a ninth tooth, a tenth tooth, an eleventh tooth, and a twelfth tooth arranged along the circumferential direction,
 the A-phase coil comprises:
  a first A-phase coil, wound around the third tooth from the driver circuit, wound around the eighth tooth across the side of the motor bracket with respect to the teeth, and returning to the driver circuit; and
  a second A-phase coil, wound around the ninth tooth from the driver circuit, wound around the second tooth across the side of the motor bracket with respect to the teeth, and returning to the driver circuit,
 the B-phase coil comprises:
  a first B-phase coil, wound around the fifth tooth from the driver circuit, wound around the tenth tooth across the side opposite to the motor bracket with respect to the teeth, and returning to the driver circuit; and
  a second B-phase coil, wound around the eleventh tooth from the driver circuit, wound around the fourth tooth across the side opposite to the motor bracket with respect to the teeth, and returning to the driver circuit,
 the C-phase coil comprises:
  a first C-phase coil, wound around the first tooth from the driver circuit, wound around the sixth tooth across the side opposite to the motor bracket with respect to the teeth, and returning to the driver circuit; and
  a second C-phase coil, wound around the seventh tooth from the driver circuit, wound around the twelfth tooth across the side opposite to the motor bracket with respect to the teeth, and returning to the driver circuit.

6. A fan device, comprising:
 the motor as claimed in claim 4; and
 a fan, rotationally driven by the motor and generating a cooling wind.

7. A stator, comprising: 12 teeth, spaced apart in a circumferential direction and forming a ring shape; a cylindrical part, protruding from an inner periphery or an outer periphery of the 12 teeth toward two sides in an axial direction; and coils respectively wound around the 12 teeth, wherein the coils comprise:
 an A-phase coil, wound around four of the 12 teeth and supplied with an A-phase current;
 a B-phase coil, wound around another four of the 12 teeth and supplied with a B-phase current;
 a C-phase coil, wound around yet another four of the 12 teeth and supplied with a C-phase current,
 wherein the A-phase coil comprises a transition part provided to extend along the cylindrical part on a side in the axial direction between the teeth spaced apart in the circumferential direction, the B-phase coil and the C-phase coil each comprise a transition part provided to extend along the cylindrical part on an other side in the axial direction between the teeth spaced apart in the circumferential direction, and connection terminals of the B-phase coil and connection terminals of the C-phase coil pass through a radially outer side with respect to the transition part of the A-phase coil.

8. A coil winding method for the motor as claimed in claim 1, the coil winding method comprising:

winding the A-phase coil;

winding the B-phase coil and the C-phase coil after winding the A-phase coil;

after winding the B-phase coil and the C-phase coil, positioning a portion of each of the A-phase coil, the B-phase coil, and the C-phase coil connected with the driver circuit.

9. A coil winding method for the motor as claimed in claim 7, the coil winding method comprising:

winding the A-phase coil;

winding the B-phase coil and the C-phase coil after winding the A-phase coil;

after winding the B-phase coil and the C-phase coil, positioning a portion of each of the A-phase coil, the B-phase coil, and the C-phase coil connected with the driver circuit.

\* \* \* \* \*